United States Patent
Schreck et al.

[11] Patent Number: 5,708,090
[45] Date of Patent: Jan. 13, 1998

[54] PROCESS FOR THE PREPARATION OF A POLYPROPYLENE MOLDING COMPOSITION

[75] Inventors: Michael Schreck, Frankfurt am Main; Andreas Winter; Volker Dolle, both of Kelkheim; Hartmut Kondoch, Frankfurt am Main; Martin Antberg, Hofheim am Taunus; Jürgen Rohrmann, Liederbach, all of Germany

[73] Assignee: Hoechst Aktiengesellschaft, Frankfurt, Germany

[21] Appl. No.: 461,406

[22] Filed: Jun. 5, 1995

Related U.S. Application Data

[60] Continuation of Ser. No. 213,618, Mar. 15, 1994, abandoned, which is a division of Ser. No. 630,264, Dec. 19, 1990, Pat. No. 5,322,902.

[30] Foreign Application Priority Data

Dec. 21, 1989 [DE] Germany ............... 39 43 363.8

[51] Int. Cl.⁶ .................................................. C08L 23/06
[52] U.S. Cl. .................. 525/240; 525/247; 525/270; 525/322
[58] Field of Search ................... 525/240, 247, 525/270, 322

[56] References Cited

U.S. PATENT DOCUMENTS

| | | | |
|---|---|---|---|
| 4,339,557 | 7/1982 | Hasuo et al. | 525/247 |
| 4,576,994 | 3/1986 | Dorrer et al. | 525/247 |
| 4,937,299 | 6/1990 | Ewen et al. | 526/119 |
| 4,948,841 | 8/1990 | Kasahara et al. | 525/240 |
| 4,950,720 | 8/1990 | Randall, Jr. et al. | 525/322 |
| 5,086,134 | 2/1992 | Antberg et al. | |
| 5,212,247 | 5/1993 | Asanuma et al. | 525/240 |

FOREIGN PATENT DOCUMENTS

| | | |
|---|---|---|
| 0 135 834 | 4/1985 | European Pat. Off. . |
| 0 302 424 | 2/1989 | European Pat. Off. . |
| 0 344 887 | 12/1989 | European Pat. Off. . |
| 3 826 075 | 2/1990 | Germany . |

*Primary Examiner*—David W. Wu
*Attorney, Agent, or Firm*—Connolly & Hutz

[57] ABSTRACT

Process for the preparation of a polypropylene molding composition

A propylene block copolymer having good flow properties and a very good low temperature impact strength is obtained in a high yield if a catalyst which consists of a chiral metallocene, containing a bridge, of the formula I

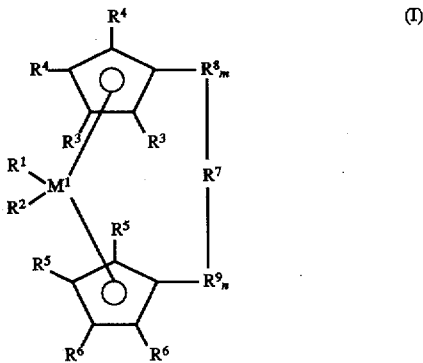

and an aluminoxane is used for the polymerization of propylene and the comonomers.

The polymerization is carried out in two stages, a crystalline propylene polymer being prepared in the first stage.

19 Claims, No Drawings

PROCESS FOR THE PREPARATION OF A POLYPROPYLENE MOLDING COMPOSITION

This application is a continuation of application Ser. No. 08/213,618 filed Mar. 15, 1994, now abandoned which is a divisional application of Ser. No. 630,264 filed Dec. 19, 1990, now U.S. Pat. No. 5,322,902.

The present invention relates to a process for the preparation of a polypropylene molding composition in which a predominantly crystalline propylene homo- or copolymer is produced in the first stage and a random copolymer of propylene with ethylene and if appropriate a second 1-olefin and a partly crystalline polymer of the second 1-olefin are produced in the second stage.

Isotactic polypropylene can be processed to shaped articles which have advantageous mechanical properties, above all a high hardness, rigidity and heat distortion point, even at higher temperatures. The good resistance to stress cracking also has an advantageous effect for many uses. In contrast, the high glass transition temperature of the amorphous constituents of the polypropylene of above 0° C. is a disadvantage. This causes a marked reduction in the impact strength and tear and flexural strength of objects produced from isotactic polypropylene as the temperature drops, especially at below 0° C.

It is therefore advantageous to add to isotactic PP a component which has a glass transition point below the use temperatures to be expected later, down to –40° C. Attempts are made to achieve this by addition of components with the lowest possible glass transition temperature, above all ethylene-propylene copolymers or polyethylene and combinations thereof with polypropylene being added. Such mixtures can be prepared by bringing the individual constituents together in roll mills, headers or extruders.

However, they are also formed by various methods of block copolymerization using Ziegler-Natta catalysts.

These processes of block copolymerization are particularly advantageous because the polymer mixture of improved impact strength and toughness is obtained in powder form and under certain circumstances granulation can be avoided before its further processing.

It is known that a polymer of improved impact strength, especially at low temperatures, can be prepared in a multistage polymerization with the aid of Ziegler-Natta catalysts, the hardness of the polypropylene being largely retained. Polymers of this type are an intimate mixture of the various components and are generally called block copolymers.

The preparation of such block copolymers with the aid of Ziegler catalysts based on an $MgCl_2$ support is known (compare U.S. Pat. No. 4,576,994).

The object is to produce a copolymer in the second stage, in which copolymer the glass transition range of the non-crystalline components should be as low as possible and should be within a narrow range, since an excellent impact strength can then be expected even at low temperatures.

It has now been found that block copolymers having excellent flow properties and in which the amorphous components have glass transition temperatures only at very low temperatures and within a narrow temperature range can be prepared particularly advantageously if a metallocene catalyst system is used for their preparation.

The invention thus relates to a process for the preparation of a polypropylene molding composition consisting of (1) 20 to 99% by weight of a crystalline polymer which consists to the extent of at least 95% by weight of polymerized propylene and (2) 1 to 80% by weight of a non-crystalline ethylene-propylene copolymer having an ethylene content of 20 to 90% by weight, in which first the polymer (1) is prepared in one or more stages in liquid propylene over a residence time of 15 to 400 minutes under a pressure of 5 to 100 bar and at a temperature of 0° to 100° C., and the polymer (2) is prepared in a second stage over a residence time of 10 to minutes, under a pressure of 5 to 49 bar and at a temperature of 0° to 100° C. in the presence of ethylene, in suspension in the presence of a catalyst which consists of a transition metal compound and an organoaluminum compound, which comprises carrying out the polymerization in the second stage in solution or in suspension, and using a transition metal compound which is a metallocene of the formula I

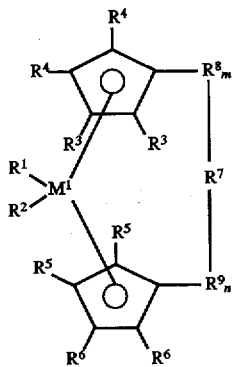

(I)

in which $M^1$ is a metal of group IVb, Vb or VIb of the periodic table, $R^1$ and $R^2$ are identical or different and are a hydrogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group or a halogen atom, $R^3$, $R^4$, $R^5$ and $R^6$ are identical or different and are a hydrogen atom, a halogen atom, a $C_1$–$C_{10}$-alkyl group, $—NR_2^{10}$, $—SR^{10}$, $—OSiR_3^{10}$, $—SiR_3^{10}$ or $PR_2^{10}$, in which $R^{10}$ is a halogen atom or a $C_1$–$C_{10}$-alkyl group, or in each case two adjacent $R^3$, $R^4$, $R^5$ or $R^6$ form a ring with the carbon atoms joining them, $R^7$ is

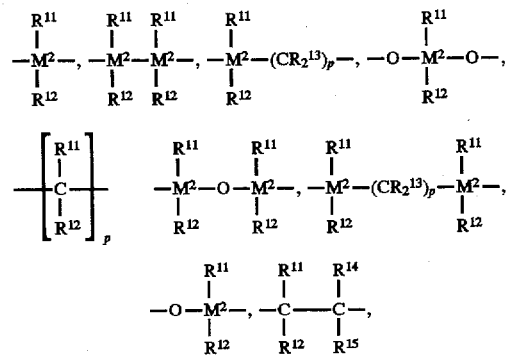

$=BR^{11}$, $=AlR^{11}$, $—Ge—$, $—Sn—$, $—O—$, $—S—$, $=S=O$, $=SO_2$, $=NR^{11}$, $=CO$, $=PR^{11}$ or $=P(O)R^{11}$, in which $R^{11}$, $R^{12}$, $R^{13}$, $R^{14}$ and $R^{15}$ are identical or different and are a hydrogen atom, a halogen atom, a $C_1$–$C_{10}$-alkyl group, a $C_1$–$C_{10}$-fluoroalkyl group, a $C_6$–$C_{10}$-aryl group, a $C_6$–$C_{10}$- fluoroaryl group, a $C_1$–$C_{10}$-alkoxy group, a $C_2$–$C_{10}$-alkenyl group, a $C_7$–$C_{40}$-arylalkyl group, a $C_8$–$C_{10}$-arylalkenyl group or a $C_7$–$C_{10}$-alkylaryl group, or $R^{11}$ and $R^{12}$ or $R^{11}$ and $R^{13}$ form a ring, in each case with the atoms joining them, $M^2$ is silicon, germanium or tin, p is 1, 2 or 3, $R^8$ and $R^9$ are identical or different and are a group $=CR^{11}R^{12}$, in which $R^{11}$ and $R^{12}$ have the abovementioned meaning, and m and n are identical or different and are zero, 1 or 2, m+n being zero, 1 or 2, and an organoaluminum compound which is an aluminoxane of the formula II

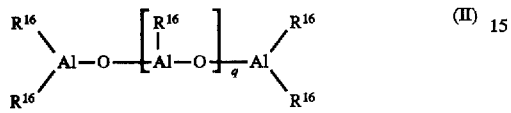

for the linear type and/or of the formula III

for the cyclic type, in which $R^{16}$ is a $C_1$–$C_6$-alkyl group and q is an integer from 2 to 50.

The catalyst to be used for the process according to the invention consists of a metallocene compound of the formula I and an aluminoxane. In formula I

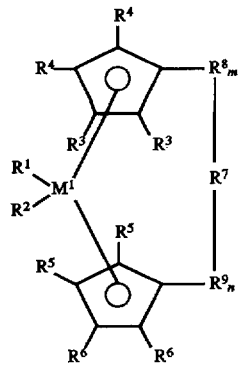

$M^1$ is a metal from group IVb, Vb or VIb of the periodic table, for example titanium, zirconium, hafnium, vanadium, niobium, tantalum, chromium, molybdenum or tungsten, preferably zirconium or hafnium.

$R^1$ and $R^2$ are identical or different and are a hydrogen atom, a $C_1$–$C_{10}$-, preferably $C_1$–$C_3$-alkyl group, a $C_1$–$C_{10}$-, preferably $C_1$–$C_3$-alkoxy group, a $C_6$–$C_{10}$-, preferably $C_6$–$C_8$-aryl group, a $C_6$–$C_{10}$-, preferably $C_6$–$C_8$-aryloxy group, a $C_2$–$C_{10}$-, preferably $C_2$–$C_4$-alkenyl group, a $C_7$–$C_{40}$-, preferably $C_7$–$C_{10}$-arylalkyl group, a $C_7$–$C_{40}$-, preferably $C_7$–$C_{12}$-alkylaryl group, a $C_8$–$C_{40}$-, preferably $C_8$–$C_{12}$-arylalkenyl group or a halogen atom, preferably chlorine.

$R^3$, $R^4$, $R^5$ and $R^6$ are identical or different, preferably different, and are a hydrogen atom, a halogen atom, preferably a fluorine, chlorine or bromine atom, a $C_1$–$C_{10}$-, preferably $C_1$–$C_3$-alkyl group, $-NR_2^{10}$, $-SR^{10}$, $-OSiR_3^{10}$, $-SiR_3^{10}$ or $PR_2^{10}$, in which $R^{10}$ is a halogen atom, preferably a chlorine atom, or a $C_1$–$C_{10}$-, preferably $C_1$–$C_3$-alkyl group, or in each case two adjacent $R^3$, $R^4$, $R^5$ or $R^6$ form a ring with the carbon atoms joining them.

$R^7$ is

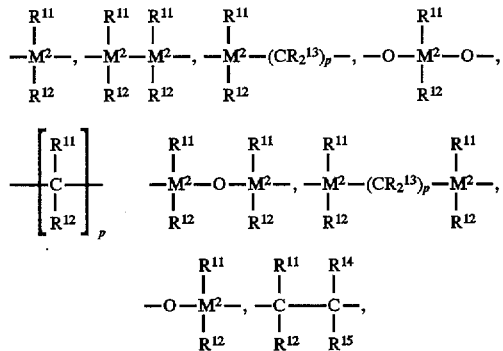

$=BR^{11}$, $=AlR^{11}$, $-Ge-$, $-Sn-$, $-O-$, $-S-$, $=S=O$, $=SO_2$, $=NR^{11}$, $=CO$, $=PR^{11}$ or $=P(O)R^{11}$, in which $R^{11}$, $R^{12}$, $R^{13}$, $R^{14}$ and $R^{15}$ are identical or different and are a hydrogen atom, a halogen atom, a $C_1$–$C_{10}$-alkyl group, preferably a $C_1$–$C_4$-alkyl group, in particular a methyl group, a $C_1$–$C_{10}$-fluoroalkyl group, preferably a $CF_3$ group, a $C_6$–$C_{10}$-, preferably $C_6$–$C_8$-aryl group, a $C_6$–$C_{10}$-fluoroaryl group, preferably a pentafluorophenyl group, a $C_1$–$C_{10}$-, preferably $C_1$–$C_4$-alkoxy group, in particular a methoxy group, a $C_2$–$C_{10}$-, preferably $C_2$–$C_4$-alkenyl group, a $C_7$–$C_{40}$-, preferably $C_7$–$C_{10}$-arylalkyl group, a $C_8$–$C_{40}$-, preferably $C_8$–$C_{12}$-arylalkenyl group or a $C_7$–$C_{40}$-, preferably $C_7$–$C_{12}$-alkylaryl group, or $R^{11}$ and $R^{12}$ or $R^{11}$ and $R^{13}$ form a ring, in each case together with the atoms joining them.

$M^2$ is Si, Ge or Sn and p is 1, 2 or 3, $R^7$ is preferably $=SiR^{11}R^{12}$, $=GeR^{11}R^{12}$, $-S-$, $-S=O$ or $=PR^{11}$, $R^8$ and $R^9$ are identical or different and are a group $=CR^{11}R^{12}$, in which $R^{11}$ and $R^{12}$ have the abovementioned meaning, and m and n are identical or different and denote zero, 1 or 2, m+n being zero, 1 or 2. Preferably, m and n are zero or 1.

The metallocenes described above can be prepared in accordance with the following equation:

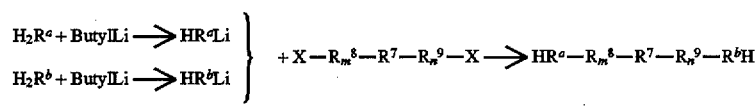

-continued

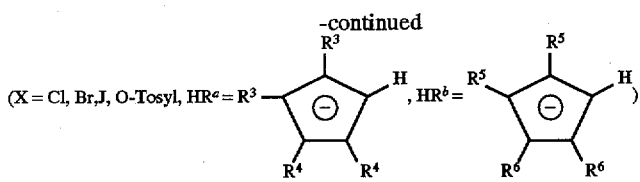

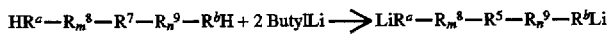

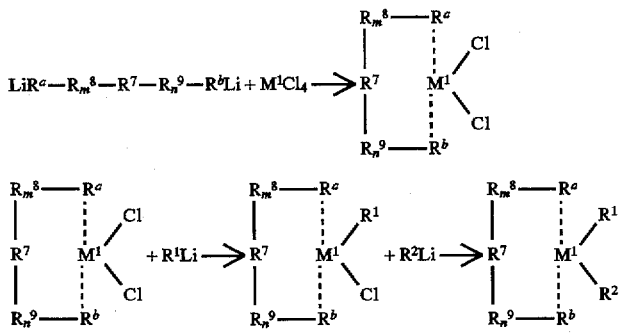

The metallocene compounds which are particularly preferably employed are rac-ethylenebisindenylhafnium dichloride, rac-dimethylsilylbisindenylhafnium dichloride, rac-phenyl(methyl)silylbisindenylhafnium dichloride and rac-dimethylsilylbisindenylzirconium dichloride.

The activator is an aluminoxane of the formula (II)

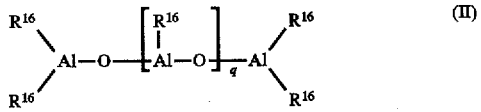

for the linear type and/or of the formula (III)

for the cyclic type. In these formulae, $R^{16}$ is a $C_1$–$C_6$-alkyl group, preferably methyl, ethyl or isobutil, in particular methyl, and q is an integer from 2 to 50, preferably 10 to 40. However, the precise structure of the aluminoxane is not certain and the formulae II and III are therefore only approximation formulae.

The aluminoxane can be prepared in various ways.

One possibility is careful addition of water to a dilute solution of an aluminum trialkyl by introducing in each case small portions of the solution of the aluminum trialkyl and the water into an initial larger amount of an inert solvent and in each case awaiting the end of the evolution of gas in between additions.

In another process, finely powdered copper sulfate pentahydrate is suspended in toluene in a glass flask and aluminum trialkyl is added under an inert gas at about $-20°$ C. in an amount such that about 1 mol of $CuSO_4.5H_2O$ is available for every 4 Al atoms. After slow-hydrolysis with alkane being split off, the reaction mixture is left to stand at room temperature for 24 to 48 hours, during which it must be cooled if appropriate, so that the temperature does not rise above $30°$ C. The aluminoxane dissolved in the toluene is then filtered off from the copper sulfate and the solution is concentrated in vacuo. It is assumed that in this preparation process the low molecular weight aluminoxanes undergo condensation to higher oligomers, aluminum trialkyl being split off.

Aluminoxanes are furthermore obtained if aluminum trialkyl, preferably aluminum trimethyl, dissolved in an inert aliphatic or aromatic solvent, preferably heptane or toluene, is reacted with aluminum salts containing water of crystallization, preferably aluminum sulfate, at a temperature of $-20°$ to $100°$ C. The volume ratio between the solvent and the aluminum alkyl used in this reaction is 1:1 to 50:1—preferably 5:1—and the reaction time, which can be checked by measuring the splitting off of the alkane, is 1 to 200 hours—preferably 10 to 40 hours.

Of the aluminum salts containing water of crystallization, those which have a high content of water of crystallization are used in particular. Aluminum sulfate hydrate, above all the compounds $Al_2(SO_4)_3.16H_2O$ and $Al_2(SO_4)_3.18H_2O$ with the particularly high water of crystallization content of 16 and 18 mol of $H_2O$/mol of $Al_2(SO_4)_3$ respectively, is particularly preferred.

Another variant for the preparation of aluminoxanes comprises dissolving aluminum trialkyl, preferably aluminum trimethyl, in the suspending agent which has been initially introduced into the polymerization kettle, preferably in the liquid monomer or heptane or toluene, and then reacting the aluminum compound with water.

In addition to the processes described above for the preparation of aluminoxanes, there are others Which can be used.

It is possible for the metallocene to be preactivated with an aluminoxane of the formula (II) and/or (III) before use in the polymerization reaction. This significantly increases the polymerization activity.

The preactivation of the transition metal compound is carried out in solution. In this preactivation, the metallocene is preferably dissolved in a solution of the aluminoxane in an inert hydrocarbon. An aliphatic or aromatic hydrocarbon is a suitable inert hydrocarbon. Toluene is preferably used.

The concentration of the aluminoxane in the solution is in the range from about 1% by weight up to the saturation limit, preferably from 5 to 30% by weight, in each case based on the total solution. The metallocene can be employed in the same concentration, but it is preferably employed in an amount of $10^{-4}$–1 mol per mol of aluminoxane. The preactivation time is 5 minutes to 60 hours, preferably 10 to 60 minutes. The preactivation is carried out in a temperature of $-78°$ C. to $100°$ C., preferably $0°$ to $70°$ C.

A significantly longer preactivation time is possible and may be entirely appropriate for storage purposes.

The homopolymerization is carried out in a known manner in solution, in suspension or in the gas phase, continuously or discontinuously in one or more stages at a temperature of 0° to 100° C., preferably 40° to 85° C. The pressure is 5 to 100 bar. Polymerization in the pressure range of 5 to 60 bar, which is of particular industrial interest, is preferred.

The metallocene compound is used in this polymerization in a concentration, based on the transition metal, of $10^{-3}$ to $10^{-7}$, preferably $10^{-4}$ to $10^{-6}$ mol of transition metal per $dm^3$ of solvent or per $dm^3$ of reactor volume. The aluminoxane is used in a concentration of $10^{-4}$ to $10^{-1}$ mol, preferably $10^{-3}$ to $10^{-2}$ mol per $dm^3$ of solvent or per $dm^3$ of reactor volume. On principle, however, higher concentrations are also possible.

The monomer to be polymerized is preferably employed as the solvent or suspending agent. The molecular weight of the polymer can be regulated in a known manner; hydrogen is preferably used for this. The polymerization is of any desired duration, since the catalyst system to be used according to the invention displays only a slight time-dependent drop in polymerization activity.

The process according to the invention is carried out in two stages, a highly crystalline polypropylene or polypropylene modified with a small amount of another 1-olefin as a comonomer being prepared in the first stage and an ethylene-propylene copolymer and a crystalline polymer formed predominantly from ethylene being formed in the second stage.

The two polymers formed in the second reaction stage can be modified by a further 1-olefin.

The polymerization in the first reaction stage is preferably carried out by pumping liquid propylene, a solution of the solid catalyst portion in a solvent and the other liquid catalyst constituents into a suitable reaction vessel. This reaction vessel can be an autoclave, a customary reaction kettle or a tube reactor in loop form, adequate mixing being ensured in the customary manner by incorporated stirrers or circulating pumps.

The heat of reaction is removed by jacket cooling, by internal cooling incorporated in the vessels or by vapor cooling.

The liquid propylene itself, which serves both as the monomer and as the suspending agent, can contain varying amounts of inert, low-boiling dissolved constituents, such as, for example, propane or nitrogen.

A reaction temperature of 0° to 100° C., preferably one of 40° to 85° C., is maintained in the first reaction stage. The pressure is 5 to 100 bar, preferably 5 to 60 bar.

The desired molecular weight of the copolymer can be established by addition of hydrogen to the propylene.

The amount of polymer prepared in the first stage is 20 to 99% by weight, preferably 40 to 95% by weight, in particular 60 to 95% by weight, based on the entire solid polymer formed in the process.

If a polypropylene modified with small amounts of another 1-olefin as a comonomer is to be prepared in the first stage, the comonomer is metered in like the other starting substances. Possible other 1-olefins are ethylene and monounsaturated hydrocarbons having 4 to 10 carbon atoms, preferably ethylene and butene, in particular ethylene. The concentration of the ethylene or 1-olefin in the liquid propylene in this case is 0 to 20 mol %. The polymer from the first stage consists of polymerized propylene to the extent of at least 95% by weight.

The polymer suspension formed in the first stage, which essentially contains the predominantly crystalline isotactic polypropylene, modified with small amounts of a 1-olefin if appropriate, the active catalyst constituents, liquid propylene, certain amounts of hydrogen and if appropriate inert contents, is now transferred to the second reaction stage.

Ethylene or an ethylene/propylene mixture and if appropriate a 1-olefin having 4 to 10 carbon atoms, as a further monomer, is introduced into the suspension at the start of the second stage until the required composition of the monomer mixture is reached.

A desired composition of the monomer mixture is maintained throughout the entire duration of the polymerization in the second stage by permanent introduction of ethylene and/or a propylene/ethylene mixture such as is obtained after working up of the reaction solution. Another 1-olefin having 4 to 10 carbon atoms can be metered in if appropriate.

The pressure in the second stage is 5 to 49 bar, preferably 10 to 49 bar.

The residence times in the individual reaction stages are adjusted so that they are 15 to 400 minutes, preferably 20 to 180 minutes, in the first stage and 10 to 180 minutes, preferably 15 to 90 minutes, in the second stage.

It is also possible for the activator additionally to be topped up in the second stage. This is advantageous above all if the polymerization in the first stage is carried out at a low molar ratio of activator to metallocene or at a low activator concentration.

If necessary, additional hydrogen is also fed into the second stage for suitable regulation of the molecular weight of the polymer prepared in that stage.

If the first stage is not carried out in a reactor which is completely filled with liquid, there is also the possibility of reducing the hydrogen content of the suspension before the start of the second stage by removal of gas mixture from the gas phase.

The temperature in the second polymerization stage is 0° to 100° C., preferably 40° to 85° C.

After the second stage has been carried out, the polymer formed is worked up. This can be effected by letting down the resulting mixture of polymer and monomer to atmospheric pressure in one or more stages and recycling the residual monomer to the circulation.

However, working up can also be effected by filtration, decantation or centrifugation in pressure-resistant units suitable for this purpose, for example in pressure filters, sedimentation towers, centrifuges or decanters.

In addition to an adequate hardness and good flow properties, the block copolymer prepared by the process according to the invention has a good impact strength over a wide temperature range, but above all at low temperatures of –40° C. and –60° C.

These polymers are by far superior in their low temperature impact strength to the polymers prepared to date using catalyst systems according to the prior art, as can be seen from the comparison with the homopolymers prepared using metallocene catalysts.

Compared with the block copolymers prepared using catalysts based on $MgCl_2$, the products prepared according to the invention are distinguished by a high catalyst yield, a solidification of the amorphous phase which takes place at a very low temperature and within a very narrow temperature range and therefore a very good low temperature impact strength.

The control of the flow properties over a very wide range, which can also additionally be extended by addition of a molecular weight regulator (as a rule hydrogen), which can be exercised by choice of the catalyst is of great advantage.

Because of the specific properties of the catalyst, very free-flowing products either cannot be achieved at all using catalysts based on $MgCl_2$ or can be achieved only by addition of large amounts of molecular weight regulators.

This addition is limited by the solubility of this regulator (as a rule hydrogen) in the polymerization medium (propylene) and also leads to process and reaction complications, especially in a continuously running process with recycling of unreacted reaction medium into the process.

The block copolymer obtained according to the invention is provided with the customary additives (stabilizers, lubricants, fillers, pigments and the like) for further processing. It can be used directly for the production of shaped articles of plastic without further pretreatment in extruders or headers.

However, it can also be converted into granule form in extruders or headers. This additional processing step may lead to an improvement in the mechanical properties of the shaped articles produced.

The properties of the polymers prepared according to the following examples were determined specifically by the following methods:

The melt flow index was measured in accordance with DIN 53 735 and has been stated in g/10 minutes.

The viscosity number VN of the polymers was determined on 0.1% strength by weight solutions in decahydronaphthalene (isomer mixture) at 135° C. in a capillary viscometer and has been stated in $cm^3/g$.

The ball indentation hardnesses were measured in accordance with DIN 53 456 on pressed sheets which had been annealed at 100° or 120° C. under $N_2$ for 3 hours, cooled in the course of 3 hours and stored in a climatically controlled chamber at 23° C. and 50% relative atmospheric humidity for 24 hours for temperature adjustment.

The flexural impact test at −40° C. and −60° C. on a standard small bar having a V notch (flank angle 45°, notch depth 1.3 mm, notch radius 1 mm) was used to determine the mechanical properties at low temperatures. The test specimens were taken from pressed sheets which had been stored at 23° C. and 50% relative atmospheric humidity for 24 hours after production.

The ethylene content was determined by IR spectroscopy on 0.1 mm thick films pressed at 180° C., the absorption bands at the wavelengths 13.65 and 13.9 μm being used for the evaluation.

The content of non-crystalline ethylene-propylene copolymer was determined by recrystallization of the block copolymers from a gasoline mixture (boiling range 140° to 170° C.) and precipitation of the contents soluble therein at 25° C. using acetone.

EXAMPLE 1

A dry kettle of 70 $dm^3$ capacity was flushed with nitrogen and filled with 40 $dm^3$ of liquid propylene. 136 $cm^3$ of a toluene solution of methylaluminoxane (=MAO, corresponding to 200 mmol of Al, average degree of oligomerization n=20) were then added and the mixture was stirred at 30° C. for 15 minutes. In parallel with this, 103.6 mg (0.205 mmol) of rac-ethylenebisindenylhafnium dichloride were dissolved in 17 $cm^3$ of MAO solution (=25 mmol of Al) and were preactivated by being left to stand for 15 minutes.

The solution was then added to the kettle. The polymerization system was heated up to a temperature of 70° C. and then kept at this temperature for 180 minutes. Ethylene was passed into the suspension until the pressure under which the monomer mixture boiled had risen to 40 bar. This pressure was maintained during the remaining 22 minutes of reaction time by forcing in more ethylene.

4.1 kg of block copolymer were obtained. The polymer had a VN of 90. 9.0% by weight of the polymer was formed by polymerization of ethylene. 63% of crystallizable contents, based on the total polymer, having an ethylene content of 1.4% by weight and a VN of 93 was obtained by recrystallization from the gasoline mixture. 37%, based on the block copolymer, of a rubbery composition having an ethylene content of 30% by weight and a VN of 85 was obtained from the mother liquor by precipitation with acetone. Its ball indentation hardness was 20 $N/mm^2$. In the enthalpy curve obtained from the differential thermal analysis (−180° to 200° C., heating rate 2 K/minute), two glass transitions were to be observed below the temperature zero point in the temperature ranges from −59° to −51° C. and from −17° to −6° C. Melting of the polymer likewise took place in two sections at 127° and 137° C. The polymer had a melt flow index 230/2.16 of 320 g/10 minutes and a notched impact strength at −40° C. of 1.9 $mJ/mm^2$.

EXAMPLE 2

A dry kettle of 70 $dm^3$ capacity was flushed with nitrogen and filled with 40 $dm^3$ of liquid propylene. 136 $cm^3$ of a toluene solution of methylaluminoxane (=MAO, corresponding to 200 mmol of Al, average degree of oligomerization n=20) were then added and the mixture was stirred at 30° C. for 15 minutes. In parallel with this, 80.6 mg (0.159 mmol) of rac-ethylenebisindenylhafnium dichloride were dissolved in 17 $cm^3$ of MAO solution (=25 mmol of Al) and preactived by being left to stand for 15 minutes.

The solution was then added to the kettle. The polymerization system was heated up to a temperature of 70° C. and then kept at this temperature for 90 minutes. Ethylene was passed into the suspension until the pressure at which the monomer mixture boiled has risen to 35 bar. This pressure was maintained throughout the remaining 30 minutes of reaction time by topping up with ethylene. 0.55 kg of block copolymer was obtained.

The polymer had a VN of 112. 10.8% by weight of the polymer was formed by polymerization of ethylene. 62% of crystallizable contents, based on the total polymer, having an ethylene content of 1.5% by weight and a VN of 132 was obtained by recrystallization from the gasoline mixture. 38%, based on the block copolymer, of a rubbery composition having an ethylene content of 26% by weight and a VN of 80 was obtained from the mother liquor by precipitation with acetone.

In the enthalpy curve obtained from the differential thermal analysis (−180° to 200° C., heating rate 2 K/minute), two glass transitions were to be observed below the temperature zero point in the temperature ranges from −60° to −51° C. and from −30° to −10° C. Melting of the polymer likewise took place in two sections at 135° and 138° C. The polymer had a melt flow index 230/2.16 of 69 g/10 minutes, a notched impact strength at −40° C. of 2.1 $mJ/mm^2$ and a notched impact strength at −60° C. of 1.8 $mJ/mm^2$. Its ball indentation hardness was 13 $N/mm^2$.

EXAMPLE 3

A dry kettle of 70 $dm^3$ capacity was flushed with nitrogen and filled with 40 $dm^3$ of liquid propylene. 136 $cm^3$ of a toluene solution of methylaluminoxane (=MAO, corresponding to 200 mmol of Al, average degree of oligomerization n=20) were then added and the mixture was stirred at 30° C. for 15 minutes. In parallel with this, 91.0 mg (0.180 mmol) of rac-ethylenebisindenylhafnium dichloride were dissolved in 17 cm³ of MAO solution (=25 mmol of Al) and were preactivated by being left to stand for 15 minutes.

The solution was then added to the kettle. The polymerization system was heated up to a temperature of 70° C. and then kept at this temperature for 180 minutes. Ethylene was passed into the suspension until the pressure at which the monomer mixture boiled had risen to 40 bar. This pressure was maintained throughout the remaining 15 minutes of reaction time by topping up with ethylene. 3.4 kg of block copolymer were obtained.

The polymer had a VN of 110. 11.5% by weight of the polymer were formed by polymerization of ethylene. 74% of crystallizable contents, based on the total polymer, having an ethylene content of 1.9% by weight and a VN of 98 was obtained by recrystallization of the gasoline mixture. 26%, based on the block copolymer, of a rubbery composition having an ethylene content of 39% by weight and a VN of 144 was obtained from the mother liquor by precipitation with acetone. In the enthalpy curve obtained from the differential thermal analysis (−180° to 200° C., heating rate 2 K/minute), two glass transitions were to be observed below the temperature zero point in the temperature ranges from −67° to −47° C. and from −18° to −7° C. Melting of the polymer likewise took place in two sections at 133° and 138° C. The polymer had a melt flow index 230/2.16 of 315 g/10 minutes, a notched impact strength at −40° C. of 1.9 mJ/mm² and a notched impact strength at −60° C. of 1.1 mJ/mm².

The polymer was converted into granule form with the addition of customary heat stabilizers. The shaped articles produced from the granules had a notched impact strength at −40° C. of 2.1 mJ/mm² and a notched impact strength at −60° C. of 1.5 mJ/mm².

EXAMPLE 4

A dry kettle of 70 dm³ capacity was flushed with nitrogen and filled with 40 dm³ of liquid propylene. 102 cm³ of a toluene solution of methylaluminoxane (=MAO, corresponding to 150 mmol of Al, average degree of oligomerization n=20) were then added and the mixture was stirred at 30° C. for 15 minutes. In parallel with this, 90 mg (0.178 mmol) of rac-ethylenebisindenylhafnium dichloride were dissolved in 17 cm³ of MAO solution (=25 mmol of Al) and were preactivated by being left to stand for 15 minutes.

The solution was then added to the kettle. The polymerization system was heated up to a temperature of 70° C. and then kept at this temperature for 180 minutes. Ethylene was passed into the suspension until the pressure at which the monomer mixture boiled had risen to 40 bar. This pressure was maintained throughout the remaining 15 minutes of reaction time by topping up with ethylene. 0.76 kg of block copolymer was obtained.

The polymer had a VN of 97. 14.8% by weight of the polymer was formed by polymerization of ethylene. 60% of crystallizable contents, based on the total polymer, having an ethylene content of 1.9% by weight and a VN of 109 was obtained by recrystallization from the gasoline mixture. 40%, based on the block copolymer, of a rubbery composition having an ethylene content of 34% by weight and a VN of 79 was obtained from the mother liquor by precipitation with acetone.

In the enthalpy curve obtained from the differential thermal analysis (−180° to 200° C., heating rate 2 K/minute), two glass transitions were to be observed below the temperature zero point in the temperature ranges from −62° to −53° C. and from −24° to −8° C. Melting of the polymer likewise took place in two sections at 135° and 139° C. The polymer had a melt flow index 230/2.16 of 85 g/10 minutes, a notched impact strength at −40° C. of 1.4 mJ/mm² and a notched impact strength at −60° C. of 1.3 mJ/mm².

EXAMPLE 5

A dry kettle of 70 dm³ capacity was flushed with nitrogen and filled with 40 dm³ of liquid propylene. 255 cm³ of a toluene solution of methylaluminoxane (=MAO, corresponding to 375 mmol of Al, average degree of oligomerization n=20) were then added and the mixture was stirred at 30° C. for 15 minutes. In parallel with this, 49.8 mg (0.098 mmol) of rac-ethylenebisindenylhafnium dichloride were dissolved in 17 cm³ of MAO solution (=25 mmol of Al) and were preactivated by being left to stand for 15 minutes.

The solution was then added to the kettle. The polymerization system was heated up to a temperature of 70° C., kept at this temperature for 50 minutes and cooled to 60° C. in the course of 10 minutes. Ethylene was passed into the suspension until the pressure at which the monomer mixture boiled had risen to 30 bar. This pressure was maintained throughout the remaining 10 minutes of reaction time by topping up with ethylene.

1.5 kg of block copolymer were obtained.

The polymer had a VN of 111. 4.3% by weight of the polymer were formed by polymerization of ethylene. 78% of crystallizable contents, based on the total polymer, having an ethylene content of 0.2% by weight and a VN of 107 was obtained by recrystallization from the gasoline mixture. 22%, based on the block copolymer, of a rubbery composition having an ethylene content of 18.8% by weight and a VN of 125 was obtained from the mother liquor by precipitation with acetone.

In the enthalpy curve obtained from the differential thermal analysis (−180° to 200° C., heating rate 2 K/minute), two glass transitions were to be observed below the temperature zero point in the temperature ranges from −63° to −49° C. and from −22° to −8° C. Melting of the polymer likewise took place in two sections at 133° and 137° C. The polymer had a melt flow index 230/2.16 of 79 g/10 minutes, a notched impact strength at −40° C. of 1.4 mJ/mm² and a notched impact strength at −60° C. of 1.3 mJ/mm².

EXAMPLE 6

A dry kettle of 70 dm³ capacity was flushed with nitrogen and filled with 40 dm³ of liquid propylene. 255 cm³ of a toluene solution of methylaluminoxane (=MAO, corresponding to 375 mmol of Al, average degree of oligomerization n=20) were then added and the mixture was stirred at 30° C. for 15 minutes. In parallel with this, 44.9 mg (0.089 mmol) of rac-ethylenebisindenylhafnium dichloride were dissolved in 17 cm³ of MAO solution (=25 mmol of Al) and were preactivated by being left to stand for 15 minutes.

The solution was then added to the kettle. The polymerization system was heated up to a temperature of 70° C., kept at this temperature for 50 minutes and cooled to 60° C. in the course of 10 minutes. Ethylene was passed into the suspension until the pressure at which the monomer mixture boiled had risen to 30 bar. This pressure was maintained throughout the remaining 20 minutes of reaction time by topping up with ethylene.

1.5 kg of block copolymer were obtained.

The polymer had a VN of 154. 7.0% by weight of the polymer was formed by polymerization of ethylene. 76% of crystallizable contents, based on the total polymer, having a VN of 146 was obtained by recrystallization from the gasoline mixture. 24%, based on the block copolymer, of a rubbery composition having an ethylene content of 29% by weight and a VN of 180 was obtained from the mother liquor by precipitation with acetone.

In the enthalpy curve obtained from the differential thermal analysis (−180° to 200° C., heating rate 2 K/minute), two glass transitions were to be observed below the temperature zero point in the temperature ranges from −61° to −51° C. and from −20° to −12° C. Melting of the polymer likewise took place in two sections at 133° and 137° C. The polymer had a melt flow index 230/5 of 74 g/10 minutes, a notched impact strength at −40° C. of 2.3 mJ/mm$^2$ and a notched impact strength at −60° C. of 1.9 mJ/mm$^2$. Its ball indentation hardness was 26 N mm$^2$.

EXAMPLE 7

A dry kettle of 70 dm$^3$ capacity was flushed with nitrogen and filled with 40 dm$^3$ of liquid propylene. 255 cm$^3$ of a toluene solution of methylaluminoxane (=MAO, corresponding to 375 mmol of Al, average degree of oligomerization n=20) were then added and the mixture was stirred at 30° C. for 15 minutes. In parallel with this, 44.8 mg (0.089 mmol) of rac-ethylenebisindenylhafnium dichloride were dissolved in 17 cm$^3$ of MAO solution (=25 mmol of Al) and were preactivated by being left to stand for 15 minutes.

The solution was then added to the kettle. The polymerization system was heated up to a temperature of 70° C., kept at this temperature for 50 minutes and cooled-to 60° C. in the course of 10 minutes. Ethylene was passed into the suspension until the pressure at which the monomer mixture boiled had risen to 35 bar. This pressure was maintained throughout the remaining 10 minutes of reaction time by topping up with ethylene.

1.5 kg of block copolymer were obtained.

The polymer had a VN of 118. 9.2% by weight of the polymer was formed by polymerization of ethylene. 72% of crystallizable contents, based on the total polymer, having an ethylene content of 0.2% by weight and a VN of 120 was obtained by recrystallization from the gasoline mixture. 28%, based on the block copolymer, of a rubbery composition having an ethylene content of 32% by weight and a VN of 113 was obtained from the mother liquor by precipitation with acetone.

In the enthalpy curve obtained from the differential thermal analysis (−180° to 200° C., heating rate 2 K/minute), two glass transitions were to be observed below the temperature zero point in the temperature ranges from −60° to −52° C. and from −18° to −10° C. Melting of the polymer likewise took place in two sections at 133° and 137° C. The polymer had a ball indentation hardness of 65N mm$^{-2}$.

EXAMPLE 8

A dry kettle of 70 dm$^3$ capacity was flushed with nitrogen and filled with 40 dm$^3$ of liquid propylene. 174 cm$^3$ of a toluene solution of methylaluminoxane (=MAO, corresponding to 256 mmol of Al, average degree of oligomerization n=20) were then added and the mixture was stirred at 30° C. for 15 minutes. In parallel with this, 85.6 mg (0.160 mmol) of rac-dimethylsilylbisindenylhafnium dichloride were dissolved in 90 cm$^3$ of MAO solution (=132 mmol of Al) and were preactivated by being left to stand for 15 minutes.

The solution was then added to the kettle. The polymerization system was heated up to a temperature of 70° C., kept at this temperature for 50 minutes and cooled-to 60° C. in the course of 10 minutes. Ethylene was passed into the suspension until the pressure at which the monomer mixture boiled had risen to 34 bar. This pressure was maintained throughout the remaining 10 minutes of reaction time by topping up with ethylene.

1.40 kg of block copolymer were obtained.

The polymer had a VN of 190. 2.9% by weight of the polymer was formed by polymerization of ethylene. 86% of crystallizable contents, based on the total polymer, having a VN of 187 was obtained by recrystallization from the gasoline mixture. 14%, based on the block copolymer, of a rubbery composition having an ethylene content of 21% by weight and a VN of 208 was obtained from the mother liquor by precipitation with acetone.

In the enthalpy curve obtained from the differential thermal analysis (−180° to 200° C., heating rate 2 K/minute), two glass transitions were to be observed below the temperature zero point in the temperature ranges from −62° to −51° C. and from −23° to −12° C. Melting of the polymer likewise took place in two sections at 133° and 157° C. The polymer had a melt flow index 230/2.16 of 9.0 g/10 minutes, a notched impact strength at −40° C. of 3.8 mJ/mm$^2$ and a notched impact strength at −60° C. of 2.5 mJ/mm$^2$.

EXAMPLE 9

A dry kettle of 70 dm$^3$ capacity was flushed with nitrogen and filled with 40 dm$^3$ of liquid propylene. 174 cm$^3$ of a toluene solution of methylaluminoxane (=MAO, corresponding to 256 mmol of Al, average degree of oligomerization n=20) were then added and the mixture was stirred at 30° C. for 15 minutes. In parallel with this, 85.6 mg (0.160 mmol) of rac-dimethylsilylbisindenylhafnium dichloride were dissolved in 90 cm$^3$ of MAO solution (=132 mmol of Al) and were preactivated by being left to stand for 15 minutes.

The solution was then added to the kettle. The polymerization system was heated up to a temperature of 70° C., kept at this temperature for 50 minutes and cooled to 60° C. in the course of 10 minutes. Ethylene was passed into the suspension until the pressure at which the monomer mixture boiled had risen to 39 bar. This pressure was maintained throughout the remaining 20 minutes of reaction time by topping up with ethylene.

1.8 kg of block copolymer were obtained.

The polymer had a VN of 197. 7.0% by weight of the polymer was formed by polymerization of ethylene. 76% of crystallizable contents, based on the total polymer, having an ethylene content of 0.2% by weight and a VN of 210 was obtained by recrystallization from the gasoline mixture. 24%, based on the block copolymer, of a rubbery composition having an ethylene content of 29% by weight and a VN of 156 was obtained from the mother liquor by precipitation with acetone.

In the enthalpy curve obtained from the differential thermal analysis (−180° to 200° C., heating rate 2 K/minute), two glass transitions were to be observed below the temperature zero point in the temperature ranges from −57° to −47° C. and from −32° to −20° C. Melting of the polymer likewise took place in two sections at 140° and 154° C. The polymer had a melt flow index 230/2.16 of 8.7 g/10 minutes, a notched impact strength at −40° C. of 2.3 mJ/mm$^2$ and a notched impact strength at −60° C. of 1.8 mJ/mm$^2$. Its ball indentation hardness was 47 N mm$^2$.

EXAMPLE 10

A dry kettle of 70 dm³ capacity was flushed with nitrogen and filled with 40 dm³ of liquid propylene. 161 cm³ of a toluene solution of methylaluminoxane (=MAO, corresponding to 256 mmol of Al, average degree of oligomerization n=20) were then added and the mixture was stirred at 30° C. for 15 minutes. In parallel with this, 5.1 mg (0.011 mmol) of rac-dimethylsilylbisindenylzirconiumdichloride were dissolved in 86 cm³ of MAO solution (=132 mmol of Al) and were preactivated by being left to stand for 15 minutes.

The solution was then added to the kettle. The polymerization system was heated up to a temperature of 70° C. and kept at this temperature for 80 minutes. After cooling to 60° C. (time required 10 minutes), ethylene was passed into the suspension until the pressure at which the monomer mixture boiled had risen to 35 bar. This pressure was maintained throughout the remaining 10 minutes of reaction time by topping up with ethylene.

4.6 kg of block copolymer were obtained.

The polymer had a VN of 56. 4.8% by weight of the polymer was formed by polymerization of ethylene. 79% of crystallizable contents, based on the total polymer, having an ethylene content of 0.4% by weight and a VN of 48 was obtained by recrystallization from the gasoline mixture. 21%, based on the block copolymer, of a rubbery composition having an ethylene content of 21% by weight and a VN of 86 was obtained from the mother liquor by precipitation with acetone.

In the enthalpy curve obtained from the differential thermal analysis (–180° to 200° C., heating rate 2 K/minute), two glass transitions were to be observed below the temperature zero point in the temperature ranges from –59° to –48° C. and from –37° to –25° C. Melting of the polymer likewise took place in two sections at 138° and 160° C. The polymer had a notched impact strength at –40° C. of 45 mJ/mm² and a notched impact strength at –60° C. of 22 mJ/mm². The melt flow index 230/5 was 20.4 g/10 minutes.

EXAMPLE 11

A dry kettle of 16 dm³ capacity was flushed with nitrogen and filled with 10 dm³ of liquid propylene. 44 cm³ of a toluene solution of methylaluminoxane (=MAO, corresponding to 64 mmol of Al, average degree of oligomerization n=20) were then added and the mixture was stirred at 30° C. for 15 minutes. In parallel with this, 41.1 mg (0.077 mmol) of rac-dimethylsilylbisindenylhafnium dichloride were dissolved in 23 cm³ of MAO solution (=34 mmol of Al) and were preactivated by being left to stand for 15 minutes.

The solution was then added to the kettle. The polymerization system was heated up to a temperature of 70° C., kept at this temperature for 30 minutes and cooled to 60° C. in the course of 5 minutes. Ethylene was passed into the suspension until the pressure at which the monomer mixture boiled had risen to 30 bar. This pressure was maintained throughout the remaining 15 minutes of reaction time by forcing in more ethylene.

0.230 kg of block copolymer were obtained.

The polymer had a VN of 187. 3.6% by weight of the polymer was formed by polymertzation of ethylene. 77% of crystallizable contents, based on the total polymer, having an ethylene content of 0.6% by weight and a VN of 186 was obtained by recrystallization from the gasoline mixture. 23%, based on the block copolymer, of a rubbery composition having an ethylene content of 14% by weight and a VN of 188 was obtained from the mother liquor by precipitation with acetone.

In the enthalpy curve obtained from the differential thermal analysis (–180° to 200° C., heating rate 2 K/minute), two glass transitions were to be observed below the temperature zero point in the temperature ranges from –57° to –48° C. and from –31° to –20° C. Melting of the polymer likewise took place in two sections at 136° and 159° C. The polymer had a melt flow index 230/5 of 18 g/10 minutes, a notched impact strength at –40° C. of 3.4 mJ/mm² and a notched impact strength at –60° C. of 2.3 mJ/mm².

EXAMPLE 12

A dry kettle of 16 dm³ capacity was flushed with nitrogen and filled with 10 dm³ of liquid propylene. 44 cm³ of a toluene solution of methylaluminoxane (=MAO, corresponding to 64 mmol of Al, average degree of oligomerization n=20) were then added and the mixture was stirred at 30° C. for 15 minutes. In parallel with this, 42.1 mg (0.079 mmol) of rac-dimethylsilylbisindenylhafnium dichloride were dissolved in 23 cm³ of MAO solution (=34 mmol of Al) and were preactivated by being left to stand for 15 minutes.

The solution was then added to the kettle. The polymerization system was heated up to a temperature of 70° C., kept at this temperature for 50 minutes and cooled to 60° C. in the course of 10 minutes. Ethylene was passed into the suspension until the pressure at which the monomer mixture boiled had risen to 33 bar. This pressure was maintained throughout the remaining 30 minutes of reaction time by forcing in more ethylene.

0.85 kg of block copolymer were obtained.

The polymer had a VN of 195. 6.1% by weight of the polymer was formed by polymerization of ethylene. 63% of crystallizable contents, based on the total polymer, having an ethylene content of 0.3% by weight and a VN of 190 was obtained by recrystallization from the gasoline mixture. 37%, based on the block copolymer, of a rubbery composition having an ethylene content of 16% by weight and a VN of 204 was obtained from the mother liquor by precipitation with acetone.

In the enthalpy curve obtained from the differential thermal analysis (–180° to 200° C., heating rate 2 K/minute), two glass transitions were to be observed below the temperature zero point in the temperature ranges from –58° to –47° C. and from –29° to –18° C. Melting of the polymer likewise took place in two sections at 132° and 155° C. The polymer had a melt flow index 230/2.16 of 5.0 g/10 minutes, a melt flow index 230/5 of 10.2 g/10 minutes, a notched impact strength at –40° C. of 2.2 mJ/mm² and a notched impact strength at –60° C. of 1.8 mJ/mm². Its ball indentation hardness was 35 N/mm².

EXAMPLE 13

A dry kettle of 16 dm³ capacity was flushed with nitrogen and filled with 10 dm³ of liquid propylene. 44 cm³ of a toluene solution of methylaluminoxane (=MAO, corresponding to 64 mmol of Al, average degree of oligomerization n=20) were then added and the mixture was stirred at 30° C. for 15 minutes. In parallel with this, 149.4 mg (0.250 mmol) of rac-phenyl(methyl)silylbisindenylhafnium dichloride were dissolved in 23 cm³ of MAO solution (=34 mmol of Al) and were preactivated by being left to stand for 15 minutes.

The solution was then added to the kettle. The polymerization system was heated up to a temperature of 70° C., kept at this temperature for 80 minutes and cooled to 60° C. in the course of 10 minutes. Ethylene was passed into the suspension until the pressure at which the monomer mixture boiled had risen to 30 bar. This pressure was maintained throughout the remaining 25 minutes of reaction time by topping up with ethylene.

0.2 kg of block copolymer was obtained.

The polymer had a VN of 130. 3.1% by weight of the polymer was formed by polymerization of ethylene. 88% of crystallizable contents, based on the total polymer, having a VN of 125 was obtained by recrystallization from the gasoline mixture. 12%, based on the block copolymer, of a rubbery composition having an ethylene content of 26% by weight and a VN of 167 was obtained from the mother liquor by precipitation with acetone.

In the enthalpy curve obtained from the differential thermal analysis (−180° to 200° C., heating rate 2 K/minute), two glass transitions were to be observed below the temperature zero point in the temperature ranges from −60° to −49° C. and from −29° to −18° C. Melting of the polymer likewise took place in two sections at 130° and 154° C. The polymer had a melt flow index 230/2.16 of 36 g/10 minutes, a melt flow index 230/5 of 122 g/10 minutes, a notched impact strength at −40° C. of 2.5 mJ/mm$^2$ and a notched impact strength at −60° C. of 2.0 mJ/mm$^2$.

EXAMPLE 14

A dry kettle of 16 dm$^3$ capacity was flushed with nitrogen and filled with 10 dm$^3$ of liquid propylene. 44 cm$^3$ of a toluene solution of methylaluminoxane (=MAO, corresponding to 64 mmol of Al, average degree of oligomerization n=20) were then added and the mixture was stirred at 30° C. for 15 minutes. In parallel with this, 150.1 mg (0.251 mmol) of rac-phenyl(methyl)silylbisindenylhafnium dichloride were dissolved in 23 cm$^3$ of MAO solution (=34 mmol of Al) and were preactivated by being left to stand for 15 minutes.

The solution was then added to the kettle. The polymerization system was heated up to a temperature of 70° C. and kept at this temperature for 180 minutes. Ethylene was passed into the suspension until the pressure at which the monomer mixture boiled had risen to 36 bar. This pressure was maintained throughout the remaining 30 minutes of reaction time by topping up with ethylene.

1.3 kg of block copolymer were obtained.

The polymer had a VN of 166. 4.5% by weight of the polymer was formed by polymerization of ethylene. 84% of crystallizable contents, based on the total polymer, having an ethylene content of 0.8% by weight and a VN of 176 was obtained by recrystallization from the gasoline mixture. 16%, based on the block copolymer, of a rubbery composition having an ethylene content of 24% by weight and a VN of 113 was obtained from the mother liquor by precipitation with acetone.

In the enthalpy curve obtained from the differential thermal analysis (−180° to 200° C., heating rate 2 K/minute), two glass transitions were to be observed below the temperature zero point in the temperature ranges from −56° to −45° C. and from −31° to −22° C. Melting of the polymer likewise took place in two sections at 140° and 151° C. The polymer had a melt flow index 230/2.16 of 17 g/10 minutes, a melt flow index 230/5 of 54 g/10 minutes, a notched impact strength at −40° C. of 2.1 mJ/mm$^2$ and a notched impact strength at −60° C. of 1.9 mJ/mm$^2$.

EXAMPLE 15

A dry kettle of 16 dm$^3$ capacity was flushed with nitrogen and filled with 10 dm$^3$ of liquid propylene. 44 cm$^3$ of a toluene solution of methylaluminoxane (=MAO, corresponding to 64 mmol of Al, average degree of oligomerization n=20) were then added and the mixture was stirred at 30° C. for 15 minutes. In parallel with this, 3.7 mg (0.008 mmol) of rac-dimethylsilylbisindenylzirconiumdichloride were dissolved in 21 cm$^3$ of MAO solution (=34 mmol of Al) and were preactivated by being left to stand for 15 minutes.

The solution was then added to the kettle. The polymerization system was heated up to a temperature of 70° C. and kept at this temperature for 50 minutes. After the temperature had fallen to 60° C. (time required 10 minutes), ethylene was passed into the suspension until the pressure at which the monomer mixture boiled had risen to 30 bar. This pressure was maintained throughout the remaining 10 minutes of reaction time by topping up with ethylene.

1.11 kg of block copolymer were obtained.

The polymer had a VN of 51. 3.8% by weight of the polymer was formed by polymerization of ethylene. 77% of crystallizable contents, based on the total polymer, having an ethylene content of 0.4% by weight and a VN of 48 was obtained by recrystallization from the gasoline mixture. 23%, based on the block copolymer, of a rubbery composition having an ethylene content of 15% by weight and a VN of 61 was obtained from the mother liquor by precipitation with acetone.

In the enthalpy curve obtained from the differential thermal analysis (−180° to 200° C., heating rate 2 K/minute), two glass transitions were to be observed below the temperature zero point in the temperature ranges from −63° to −50° C. and from −32° to −23° C. Melting of the polymer likewise took place in two sections at 138° and 162° C. The polymer had a notched impact strength at −40° C. of 2.2 mJ/mm$^2$ and a notched impact strength at −60° C. of 1.7 mJ/mm$^2$ and a melt flow index 230/5 of 29 g/10 minutes.

Comparison Example A

A dry kettle of 16 dm$^3$ capacity was flushed with nitrogen and filled with 10 dm$^3$ of liquid propylene. 43 cm$^3$ of a toluene solution of methylaluminoxane (=MAO, corresponding to 68 mmol of Al, average degree of oligomerization n=20) were then added and the mixture was stirred at 30° C. for 15 minutes. In parallel with this, 17.7 mg (0.034 mmol) of rac-ethylenebisindenylhafnium chloride were dissolved in 21.4 cm$^3$ of MAO solution (=34 mmol of Al) and were preactivated by being left to stand for 15 minutes.

The solution was then added to the kettle. The polymerization system was heated up to a temperature of 70° C. and then kept at this temperature for 60 minutes. 1.03 kg of polymer having a VN of 124 were obtained. 97.7% by weight of crystallizable contents, based on the total polymer, were obtained by recrystallization from the gasoline mixture.

2.3% by weight, based on the polymer, of a tacky mass having a VN of 36 was obtained from the mother liquor by precipitation with acetone.

In the enthalpy curve obtained from the differential thermal analysis (−180° to 200° C., heating rate 2 K/minute), no glass transition was to be observed below the temperature zero point. Melting of the polymer took place at 138° C. The polymer had a notched impact strength at −40° C. of 1.4 mJ/mm$^2$ and a notched impact strength at −60° C. of 1.3 mJ/mm$^2$.

Comparison Example B

A dry kettle of 16 dm$^3$ capacity was flushed with nitrogen and filled with 10 dm$^3$ of liquid propylene. 43 cm$^3$ of a toluene solution of methylaluminoxane (=MAO, corresponding to 64 mmol of Al, average degree of oligomerization n=20) were then added and the mixture was stirred at 30° C. for 15 minutes. In parallel with this, 42.6 mg (0.079 mmol) of rac-dimethylsilylbisindenylhafnium dichloride were dissolved in 21.4 cm$^3$ of MAO solution (=34 mmol of Al) and were preactivated by being left to stand for 15 minutes.

The solution was then added to the kettle. The polymerization system was heated up to a temperature of 70° C. and kept at this temperature for 60 minutes. 2.15 kg of polymer having a VN 173 were obtained. 99.7% by weight of crystallizable contents, based on the total polymer, were obtained by recrystallization from the gasoline mixture.

0.3% by weight, based on the polymer, ... was obtained from the mother liquor by precipitation with acetone. In the enthalpy curve obtained from the differential thermal analysis (–180° to 200° C., heating rate 2 K/minute), no glass transition was to be observed below the temperature zero point. Melting of the polymer took place at 158° C. The polymer had a melt flow index 230/2.16 of 17 g/10 minutes, a notched impact strength at –40° C. of 1.6 mJ/mm$^2$ and a notched impact strength at –60° C. of 1.3 mJ/mm$^2$.

Comparison Example C

A dry kettle of 16 dm$^3$ capacity was flushed with nitrogen and filled with 10 dm$^3$ of liquid propylene. 43 cm$^3$ of a toluene solution of methylaluminoxane (=MAO, corresponding to 64 mmol of Al, average degree of oligomerization n=20) were then added and the mixture was stirred at 30° C. for 15 minutes. In parallel with this, 122.2 mg (0.204 mmol of Al) of rac-phenyl(methyl)silylbisindenylhafnium dichloride were dissolved in 21.4 cm$^3$ of MAO solution (=34 mmol of Al) and were preactivated by being left to stand for 15 minutes.

The solution was then added to the kettle. The polymerization system was heated up to a temperature of 70° C. and then kept at this temperature for 60 minutes. 0.75 kg of polymer having a VN of 141 was obtained. 96.5% by weight of crystallizable contents, based on the total polymer, were obtained by recrystallization from the gasoline mixture.

3.5% by weight, based on the polymer, of a tacky mass having a VN of 106 was obtained from the mother liquor by precipitation with acetone.

In the enthalpy curve obtained from the differential thermal analysis (–180° to 200° C., heating rate 2 K/minute), no glass transition was to be observed below the temperature zero point. Melting of the polymer took place at 154° C. The polymer had a melt flow index 230/2.16 of 24 g/10 minutes, a notched impact strength at –40° C. of 1.5 mJ/mm$^2$ and a notched impact strength at –60° C. of 1.0 mJ/mm$^2$.

Comparison Example D

A dry kettle of 16 dm$^3$ capacity was flushed with nitrogen and filled with 10 dm$^3$ of liquid propylene. 43 cm$^3$ of a toluene solution of methylaluminoxane (=MAO, corresponding to 64 mmol of Al, average degree of oligomerization n=20) were then added and the mixture was stirred at 30° C. for 15 minutes. In parallel with this, 5.2 mg (0.012 mmol) of rac-dimethylsilylbisindenylzirconium dichloride were dissolved in 21.4 cm$^3$ of MAO solution (=34 mmol of Al) and were preactivated by being left to stand for 15 minutes.

The solution was then added to the kettle. The polymerization system was heated up to a temperature of 70° C. and then kept at this temperature for 60 minutes. 2.10 kg of polymer having a VN of 47 were obtained. 98.5% by weight of crystallizable contents, based on the total polymer, were obtained by recrystallization from the gasoline mixture.

1.5% by weight, based on the polymer, of a tacky mass having a VN of 26 was obtained from the mother liquor by precipitation with acetone.

In the enthalpy curve obtained from the differential thermal analysis (–180° to 200° C., heating rate 2 K/minute), no glass transition was to be observed below the temperature zero point. Melting of the polymer took place at 160° C. The polymer had a notched impact strength at –40° C. of 1.1 mJ/mm$^2$ and a notched impact strength at –60° C. of 0.8 mJ/mm$^2$.

Comparison Example E

Preparation of a solid titanium catalyst component 9.52 g (100mmol) of anhydrous magnesium chloride, 50 cm$^3$ of decane and 46.8 cm$^3$ (300 mmol) of 2-ethylhexyl alcohol were reacted at 130° C. for 2 hours so that a uniform solution formed. 2.22 g (15.0 mmol) of phthalic anhydride were added to this. The mixture was stirred at 130° C. for a further hour, until the phthalic anhydride had dissolved. The resulting solution was cooled to room temperature, and 400 cm$^3$ (3.6 mol) of titanium tetrachloride kept at –20° C. were added dropwise in the course of 1 hour, after which the mixture was heated to 110° C. for 4 hours. When the temperature of 110° C. was reached, 5.36 cm$^3$ (25.0 mmol) of diisobutylphthalate were added. The mixture was stirred at this temperature for a further 2 hours. It was then filtered hot in order to obtain the solid content, which was suspended in 400 cm$^3$ of titanium tetrachloride again and reacted at 110° C. for 2 hours. The solid content was then collected by hot filtration and washed with hot decane and hexane at 110° C., until free titanium compound was no longer to be detected in the wash solvents.

The solid titanium catalyst component thus obtained was stored in the form of a suspension in hexane. A portion of the suspension was dried to analyze the composition of the catalyst. The analysis showed 2.5% by weight of titanium, 56.4% by weight of chlorine, 17.5% by weight of magnesium and 21.0% by weight of diisobutyl phthalate.

Polymerization

H$_2$ was initially introduced into a kettle of 70 dm$^3$ capacity up to an internal pressure of 1.5 bar, 40 dm$^3$ of liquid propylene were introduced and 200 mmol of triethylaluminum, 40 mmol of diphenyldimethoxysilane and 4.53 cm$^3$ of the contact suspension described above (corresponding to 0.08 mmol of Ti) were metered in successively. The contents of the kettle were now heated up to 70° C. and the polymerization of the propylene was carried out for 80 minutes. After the internal temperature had been reduced to 60° C. in the course of 10 minutes, ethylene was passed in and the internal pressure was brought to 32 bar. This pressure was maintained throughout the remaining 50 minutes of reaction time by topping up with ethylene.

0.75 kg of block copolymer was obtained.

The polymer had a VN of 138. 5.7% by weight of the polymer was formed by polymerization of ethylene. 94% of crystallizable contents, based on the total polymer, having an ethylene content of 3.0% by weight, and a VN of 139 were obtained by recrystallization from the gasoline mixture. 6%, based on the block copolymer, of a rubbery composition having an ethylene content of 47% by weight and a VN of 79 was obtained from the mother liquor by precipitation with acetone.

In the enthalpy curve obtained from the differential thermal analysis (−180° to 200° C., heating rate 2 K/minute), a glass transition was to be observed below the temperature zero point in the temperature range from −56° to −25° C.

The polymer had a melt flow index 230/2.16 of 230 g/10 minutes, a notched impact strength at −40° C. of 0.9 mJ/mm² and a notched impact strength at −60° C. of 0.6 mJ/mm².

We claim:

1. A polypropylene molding composition which comprises:

(1) 20 to 99% by weight of a crystalline polymer which comprises to the extent of at least 95% by weight of polymerized propylene and (2) 1 to 80% by weight of a non-crystalline ethylene-propylene copolymer having an ethylene content of 20 to 90% by weight, in which first the polymer (1) is prepared in one or more stages in liquid propylene over a residence time of 15 to 400 minutes under a pressure of 5 to 100 bar and at a temperature of 0° to 100° C., and the polymer (2) is prepared in a second stage over a residence time of 10 to 180 minutes, under a pressure of 5 to 49 bar and at a temperature of 0° to 100° C. in the presence of ethylene, in the presence of a catalyst which comprised of a transition metal compound and an organoaluminum compound, which comprises carrying out the polymerization in the second stage in solution or in suspension, and using a transition metal compound which is a metallocene of the formula I

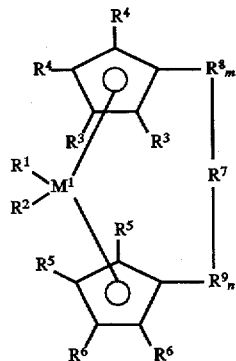

in which

M$^1$ is a metal of group IVb, Vb or VIb of the periodic table,

R$^1$ and R$^2$ are identical or different and are a hydrogen atom, a C$_1$–C$_{10}$-alkyl group, a C$_1$–C$_{10}$-alkoxy group, a C$_6$–C$_{10}$-aryl group, a C$_6$–C$_{10}$-aryloxy group, a C$_2$–C$_{10}$-alkenyl group, a C$_7$–C$_{40}$-arylalkyl group, a C$_7$–C$_{40}$-alkylaryl group, a C$_8$–C$_{40}$-arylalkenyl group or a halogen atom, R$^3$, R$^4$, R$^5$ and R$^6$ are identical or different and are a hydrogen atom, a halogen atom, a C$_1$–C$_{10}$-alkyl group, —NR$_2^{10}$, —SR$^{10}$, —OSiR$_3^{10}$, —SiR$_3^{10}$ or PR$_2^{10}$, in which R$^{10}$ is a halogen atom or a C$_1$–C$_{10}$-alkyl group, or in each case two adjacent R$^3$, R$^4$, R$^5$ or R$^6$ form a ring with the carbon atoms joining them, R$^7$ is

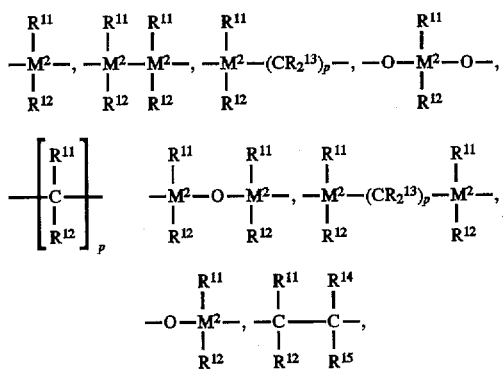

=BR$^{11}$, =AlR$^{11}$, —Ge—, —Sn—, —O—, —S—, =S=O, =SO$_2$, =NR$^{11}$, =CO, =PR$^{11}$ or =P(O)R$^{11}$, in which R$^{11}$, R$^{12}$, R$^{13}$, R$^{14}$ and R$^{15}$ are identical or different and are a hydrogen atom, a halogen atom, a C$_1$–C$_{10}$-allyl group, a C$_1$–C$_{10}$-fluoroalkyl group, a C$_6$–C$_{10}$-aryl group, a C$_6$–C$_{10}$-fluoroaryl group, a C$_1$–C$_{10}$-alkoxy group, a C$_2$–C$_{10}$-alkenyl group, a C$_7$–C$_{40}$-arylalkyl group, a C$_8$–C$_{40}$-arylalkenyl group or a C$_7$–C$_{40}$-alkylaryl group, or R$^{11}$ and R$^{12}$ or R$^{11}$ and R$^{13}$ form a ring, in each case with the atoms joining them, M$^2$ is silicon, germanium or tin, p is 1, 2 or 3, R$^8$ and R$^9$ are identical or different and are a group =CR$^{11}$R$^{12}$, in which R$^{11}$ and R$^{12}$ have the above-mentioned meaning, and m and n are identical or different and are zero, 1 or 2, m+n being zero, 1 or 2, and an organoaluminum compound which is an aluminoxane of the formula II

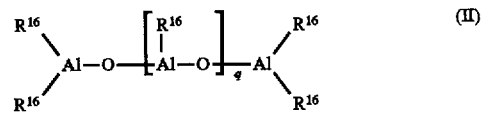

for the linear type and/or of the formula III

for the cyclic type, in which R$^{16}$ is a C$_1$–C$_6$-alkyl group and q is an integer from 2 to 50.

2. The composition as claimed in claim 1, wherein not more than 5 mol % of a 1-olefin having 4 to 10 carbon atoms is additionally employed in the preparation of the polymers (1) and (2).

3. A shaped article-formed of the polypropylene molding composition of claim 2.

4. A shaped article-formed of the polypropylene molding composition as claimed in claim 1.

5. The composition as claimed in claim 1, wherein the metallocene is rac-ethylenebisindenylhafnium dichloride.

6. The composition as claimed in claim 1, wherein the metallocene is rac-dimethylsilylbisindenylhafnium dichloride.

7. The composition as claimed in claim 1, wherein the metallocene is rac-phenyl(methyl)silylbisindenylhafnium dichloride.

8. The composition as claimed in claim 1, wherein the metallocene is rac-dimethylsilylbisindenylzirconium dichloride.

9. The composition as claimed in claim 1, wherein $M^1$ is zirconium, hafnium, vanadium, niobium, tantalum, chromium, molybdenum or tungsten.

10. The composition as claimed in claim 9, wherein $M^1$ is zirconium or hafnium.

11. The composition as claimed in claim 10, wherein $R^1$ and $R^2$ are identical or different and are a hydrogen atom, a $C_1$–$C_3$-alkyl group, a $C_1$–$C_3$-alkoxy group, a $C_6$–$C_8$-aryl group, a $C_6$–$C_8$-aryloxy group, a $C_2$–$C_4$-alkenyl group, a $C_7$–$C_{10}$-arylalkyl group, a $C_7$–$C_{12}$-alkylaryl group, a $C_8$–$C_{12}$-arylalkenyl group or a chlorine atom.

12. The composition as claimed in claim 11, wherein $R^3$, $R^4$, $R^5$ and $R^6$ are identical or different and are a hydrogen atom, a fluorine atom, a chloride atom, a bromine atom, a $C_1$–$C_3$-alkyl group, $-NR_2^{10}$, $-SR^{10}$, $-OSiR_3^{10}$, $-SiR_3^{10}$ or $PR_2^{10}$, in which $R^{10}$ is a chlorine atom or a $C_1$–$C_3$-alkyl group.

13. The composition as claimed in claim 12, wherein $R^{12}$, $R^{13}$, $R^{14}$ and $R^{15}$ are identical or different and are a hydrogen atom, a halogen atom, a $C_1$–$C_4$-alkyl group, a $CF_3$ group, a $C_6$–$C_8$-aryl group, a pentafluorophenyl group, a $C_1$–$C_4$-alkoxy group, a $C_2$–$C_4$-alkenyl group, a $C_7$–$C_{10}$-arylalkyl group, a $C_8$–$C_{12}$-arylalkenyl group or a $C_7$–$C_{12}$-alkylaryl group.

14. The composition as claimed in claim 13, wherein m+n is 0 or 1.

15. The compound as claimed in claim 14, wherein $R^{16}$ is methyl and q is an integer from 10 to 40.

16. A shaped article formed with a polypropylene molding composition of claim 15.

17. The composition as claimed in claim 1, wherein the metallocene is selected from the group consisting of rac-ethylenebisindenylhafnium dichloride, rac-dimethylsilylbisindenylhafnium dichloride, rac-phenyl(methyl)silylbisindenylhafnium dichloride and rac-dimethylsilylbisindenylzirconium dichloride.

18. The compound as claimed in claim 17, wherein $R^{16}$ is methyl and q is an integer from 10 to 40.

19. A shaped article formed with a polypropylene molding composition of claim 18.

* * * * *